United States Patent
Narayanan et al.

(10) Patent No.: US 7,812,284 B2
(45) Date of Patent: Oct. 12, 2010

(54) BARIUM AND LITHIUM RATIO FOR FLUX CORED ELECTRODE

(75) Inventors: Badri K. Narayanan, Euclid, OH (US); Patrick T. Soltis, Shaker Hts., OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1491 days.

(21) Appl. No.: 11/180,998

(22) Filed: Jul. 12, 2005

(65) Prior Publication Data

US 2007/0012673 A1 Jan. 18, 2007

(51) Int. Cl.
*B23K 35/34* (2006.01)
(52) U.S. Cl. .................... 219/146.23; 219/146.24; 219/146.1
(58) Field of Classification Search ............ 219/146.23, 219/146.24, 146.1, 145.22, 145.1
See application file for complete search history.

(56) References Cited

U.S. PATENT DOCUMENTS

| | | | |
|---|---|---|---|
| 2,802,762 A | 8/1957 | Stetson et al |
| 3,177,340 A | 4/1965 | Danhier |
| 3,415,976 A | 12/1968 | Smith |
| 3,458,685 A | 7/1969 | Tezuka |
| 3,461,270 A | 8/1969 | Patton |
| 3,466,417 A | 9/1969 | Chapman |
| 3,539,765 A | 11/1970 | Duttera |
| 3,566,073 A | 2/1971 | Black |
| 3,585,343 A | 6/1971 | Crichton |
| 3,585,352 A | 6/1971 | Zvanut |
| 3,596,053 A | 7/1971 | Kameda |
| 3,627,574 A | 12/1971 | DeLong |
| 3,670,135 A * | 6/1972 | Zvanut .................... 219/137 R |
| 3,702,390 A * | 11/1972 | Blake et al. ............ 219/146.52 |
| 3,742,185 A | 6/1973 | Parks |
| 3,767,891 A * | 10/1973 | Haverstraw et al. ...... 219/146.3 |
| 3,769,491 A | 10/1973 | De Long et al. |
| 3,778,588 A | 12/1973 | Bishel |
| 3,778,589 A | 12/1973 | Nakabayashi |
| 3,786,658 A | 1/1974 | Kammer |
| 3,866,015 A | 2/1975 | Matsumoto |
| 3,883,713 A | 5/1975 | Gurevich |
| 3,911,244 A | 10/1975 | Nakamura |
| 4,010,309 A | 3/1977 | Peterson |
| 4,020,320 A | 4/1977 | Pijls |
| 4,072,845 A | 2/1978 | Buckingham |
| 4,122,238 A | 10/1978 | Frantzerb |
| 4,149,063 A * | 4/1979 | Bishel ................... 219/146.23 |
| 4,154,999 A | 5/1979 | Pinfold et al. |
| 4,186,293 A * | 1/1980 | Gonzalez et al. ........ 219/146.24 |
| 4,207,454 A | 6/1980 | Safonnikov et al. |
| 4,314,136 A | 2/1982 | Kotecki |
| 4,366,364 A | 12/1982 | Giese |
| 4,376,881 A | 3/1983 | Safonnikov et al. |
| 4,449,031 A | 5/1984 | Kotecki |
| 4,454,406 A | 6/1984 | Safonnikov et al. |
| 4,465,036 A | 8/1984 | Sakai et al. |
| 4,465,921 A | 8/1984 | Sakai |
| 4,510,374 A | 4/1985 | Kobayashi |
| 4,512,822 A * | 4/1985 | Barringer et al. .............. 148/24 |
| 4,551,610 A * | 11/1985 | Amata ..................... 219/146.3 |
| 4,557,768 A * | 12/1985 | Barringer et al. .............. 148/24 |
| 4,571,480 A * | 2/1986 | Sakai et al. ............. 219/146.3 |
| 4,689,461 A | 8/1987 | Gamberg |
| 4,717,536 A * | 1/1988 | Chai et al. .................. 420/103 |
| 4,723,061 A | 2/1988 | Munz |
| 4,800,131 A | 1/1989 | Marshall |
| 4,803,340 A | 2/1989 | Sato |
| 4,833,296 A | 5/1989 | Crockett et al. |
| 4,889,969 A | 12/1989 | Kawai |
| 4,948,936 A | 8/1990 | Landry |
| 4,999,479 A | 3/1991 | Paton |
| 5,003,155 A | 3/1991 | Chai |
| 5,015,823 A | 5/1991 | Crockett |
| 5,055,655 A | 10/1991 | Chai |
| 5,091,628 A | 2/1992 | Chai |
| 5,120,931 A | 6/1992 | Kotecki |
| 5,124,529 A | 6/1992 | Nishikawa |
| 5,124,530 A | 6/1992 | O'Donnell |
| 5,132,514 A | 7/1992 | Chai |
| 5,225,661 A | 7/1993 | Chai |
| 5,233,160 A | 8/1993 | Gordish |
| 5,304,346 A | 4/1994 | O'Donnell |
| 5,308,698 A | 5/1994 | Bishel |
| 5,365,036 A | 11/1994 | Crockett |
| 5,369,244 A | 11/1994 | Kulikowski |
| 5,861,605 A | 1/1999 | Ogawa |
| 5,914,061 A | 6/1999 | Ogawa |
| 6,124,569 A | 9/2000 | Bonnet |
| 6,300,596 B1 | 10/2001 | Bonnet |
| 6,337,144 B1 | 1/2002 | Shimizu |
| 6,340,396 B1 | 1/2002 | Ogawa |

(Continued)

FOREIGN PATENT DOCUMENTS

EP 0120920 10/1984

(Continued)

*Primary Examiner*—M. Alexandra Elve
(74) *Attorney, Agent, or Firm*—Hahn Loeser & Parks, LLP; Keith J. Marcinowski

(57) ABSTRACT

Various slag systems exhibiting improved flow characteristics and weld puddle properties are provided. Also provided are flux cored electrodes for producing the noted slag systems and related methods of arc welding.

11 Claims, No Drawings

U.S. PATENT DOCUMENTS

| | | |
|---|---|---|
| 6,441,334 B1 | 8/2002 | Aida |
| 6,521,867 B2 | 2/2003 | Bonnet |
| 6,573,476 B2 | 6/2003 | Kim |
| 6,649,872 B2 | 11/2003 | Kato |
| 6,713,723 B2 | 3/2004 | Lee |
| 6,723,954 B2 | 4/2004 | Nikodym |
| 6,841,246 B2 | 1/2005 | Shimizu |
| 7,271,365 B2 | 9/2007 | Stava et al. |
| 2001/0023863 A1 | 9/2001 | Bonnet |
| 2002/0037420 A1 | 3/2002 | Shimizu |
| 2002/0043307 A1 | 4/2002 | Ishida |
| 2002/0060212 A1 | 5/2002 | Kim |
| 2003/0094444 A1 | 5/2003 | Kato |
| 2003/0116234 A1 | 6/2003 | Santella |
| 2003/0116550 A1 | 6/2003 | Lee |
| 2004/0020912 A1 | 2/2004 | Hara |
| 2004/0187961 A1 | 9/2004 | Crockett |
| 2004/0188407 A1 | 9/2004 | Nikodym |
| 2004/0256370 A1 | 12/2004 | Keegan |
| 2005/0121110 A1 * | 6/2005 | Dallam et al. ............ 148/23 |
| 2006/0070983 A1 | 4/2006 | Narayanan et al. |
| 2007/0170163 A1 | 7/2007 | Narayanan |

FOREIGN PATENT DOCUMENTS

| | | |
|---|---|---|
| EP | 0125925 A2 | 11/1984 |
| EP | 0231570 | 8/1987 |
| EP | 0231570 A2 | 8/1987 |
| EP | 774317 | 2/2002 |
| GB | 1297865 | 11/1972 |
| GB | 1297865 A | 11/1972 |
| GB | 1397685 A | 6/1975 |
| GB | 2020591 | 11/1979 |
| GB | 2020591 A | 11/1979 |
| GB | 2155045 | 9/1985 |
| JP | 6-023547 | 2/1985 |
| JP | 05228691 A | 9/1993 |
| JP | 05237693 A | 9/1993 |
| JP | 2000126893 A | 5/2000 |
| JP | 2000301382 A | 10/2000 |
| JP | 20000288730 | 10/2000 |
| RU | 1780979 A1 | 12/1992 |
| RU | 1826 338 | 8/1996 |

* cited by examiner

BARIUM AND LITHIUM RATIO FOR FLUX CORED ELECTRODE

The present invention relates to particular ratios of barium and lithium for flux cored electrodes such as used in a variety of arc welding processes.

BACKGROUND OF INVENTION

In the field of arc welding, the main types of welding processes are gas-metal arc welding with solid (GMAW) or metal cored wires (GMAW-C), gas shielded flux-cored arc welding (FCAW-G), self-shielded flux-cored arc welding (FCAW-S), shielded metal arc welding (SMAW) and submerged arc welding (SAW).

Metal cored electrodes are used increasingly as an alternative to solid wires because of increased productivity during welding fabrication of structural components. Metal cored electrodes are composite electrodes consisting of a core (fill) material surrounded by a metallic outer sheath. The core consists mainly of iron powder and alloying and fluxing ingredients to help with arc stability, weld wetting and appearance etc., such that the desired appearance and mechanical properties are obtained in the weld. Metal cored electrodes are manufactured by mixing the ingredients of the core material and depositing them inside a formed strip, and then closing and drawing the strip to the final diameter. Metal cored electrodes provide increased deposition rates and produce a wider, more consistent weld penetration profile compared to solid electrodes. Moreover, they provide improved arc action, generate less fume and spatter, and provide weld deposits with better wetting compared to solid electrodes.

FCAW-S electrodes do not use any shielding during welding and protection of the weld metal from the ambient is achieved through the use of deoxidizers and dentriders like Al, Mg, Ti and Zr. However, a certain ratio of barium to lithium is often utilized in order to control the melting range and the fluidity of the slag and weld puddle. This ratio can be modified to render the electrode appropriate for welding out of position, i.e. either vertically up or vertically down. From ternary diagrams of barium, lithium and strontium fluorides, it is known that melting point is generally reduced with increasing levels of lithium fluoride.

Although electrodes with barium and lithium compounds are known, a need still remains for electrode and resulting slag compositions that exhibit improved properties, particularly with respect to the proportions of barium and lithium and the flow characteristics of the slag and weld puddle properties resulting therefrom.

THE INVENTION

In a first aspect, the present invention provides a flux cored electrode in which the components of the core are chosen to produce a particular slag system. The core components include from about 35% to about 55% barium fluoride, and from about 2% to about 12% lithium fluoride.

In another aspect, the present invention provides a flux cored electrode comprising barium and lithium in a mass ratio of total barium to total lithium of from about 8:1 to about 12:1.

In yet another aspect, the present invention provides a slag system resulting from a flux cored electrode, the slag system resulting from the presence of from about 35% to about 55% barium fluoride and from about 2% to about 12% lithium fluoride in the core of the electrode.

In yet another aspect, the present invention provides a method of arc welding using a flux cored electrode. The method comprises providing a flux cored electrode that produces a slag system resulting from the presence of (i) from about 35% to about 55% barium fluoride and (ii) from about 2% to about 12% lithium fluoride in the core of the electrode. The method also comprises passing an electric current through the electrode to thereby produce the slag system.

In yet another aspect, the present invention provides a method of arc welding using a flux cored electrode. The method comprises providing a flux cored electrode that includes barium and lithium in a mass ratio of total barium to total lithium of from about 8:1 to about 12:1. The method also comprises passing an electric current through the electrode to thereby produce the slag system.

These and other objects and advantages will become apparent from the following description.

PREFERRED EMBODIMENTS

The present invention is based upon a discovery that excellent properties in a resulting slag can be obtained if barium and lithium are utilized in certain proportions, in the slag. Accordingly, various preferred embodiment slag systems, electrode compositions for forming such slag systems, and related methods of use are provided.

A preferred electrode composition in accordance with the present invention comprises:

barium fluoride, as the barium source, from about 35 to about 55% of the core material (by weight), lithium fluoride, as the lithium source, from about 2 to about 12% of the core material (by weight), barium carbonate, as a secondary barium source, from about 0 to about 8% of the core material (by weight), lithium carbonate, as the secondary lithium source, from about 0 to about 8% of the core material (by weight) as lithium carbonate, lithium oxide, from about 2 to about 15% of the core material, iron oxide, from about 5 to about 20% of the core material, calcium oxide, from about 0 to about 5% of the core material, silicon oxide, from about 0 to about 5% of the core material, manganese oxide, from about 0 to about 5% of the core material, aluminum, magnesium, titanium, zirconium, or combinations thereof, up to about 25% of the core material, for deoxidation and denitriding, and the remaining core material including metallics such as, but not limited to iron, nickel, manganese and/or silicon.

Preferably, a barium to lithium ratio from about 8:1 to about 12:1, respectively, is utilized for optimum weldability and good operating range. This ratio is the mass ratio of total barium to total lithium in the electrode. A ratio less than about 8:1 will cause poor arc action while a ratio greater than about 12:1 will cause poor voltage range and produce welds with porosity.

Set forth below in Table 1 is a representative core formulation of a flux cored electrode used for forming the preferred slag systems. All percentages in Table 1 are based upon the weight of the electrode core formulation, which in turn constitutes about 20% of the electrode by weight.

TABLE 1

| Representative Core Formulation | |
|---|---|
| Al | 15.371 |
| C | 0.023 |
| Co | 0.021 |
| Cu | 0.018 |
| Fe | 10.066 |
| Mg | 3.921 |
| Mn | 5.166 |
| Na | 0.008 |
| Nb | 0.003 |
| Ni | 4.102 |
| P | 0.006 |
| Pb | 0.004 |
| S | 0.062 |
| Si | 0.049 |
| Sn | 0.004 |
| Ti | 0.011 |
| Zn | 0.018 |
| Zr | 0.786 |
| $Al_2O_3$ | 0.364 |
| CaO | 1.8 |
| $Fe_2O_3$ | 17.802 |
| $K_2O$ | 0.205 |
| $Li_2O$ | 0.758 |
| $SiO_2$ | 4.3 |
| $TiO_2$ | 0.019 |
| $BaF_2$ | 27.819 |
| $K_2SiF_6$ | 0.975 |
| LiF | 5.258 |
| NaF | 0.002 |
| $SrF_2$ | 4.972 |

The preferred embodiment slag systems and electrodes for forming such systems can employ a wide range of compounds used in the electrode for providing a source of barium in the resulting slag. For example, it is contemplated that barium monoferrate ($BaFe_2O_4$) and complexes of BaO, $Fe_2O_3$, CaO, $SiO_2$, and/or $TiO_2$ can be used in the electrode. Although generally less preferred due to its strong hygroscopic properties, BaO by itself, could in certain embodiments, be used in the electrode.

The preferred embodiment slag systems and electrodes for forming such systems can utilize a wide array of compounds used in the electrode for providing a source of lithium in the resulting slag. For example, it is contemplated that various complexes of $Li_2O$, $Fe_2O_3$, $MnO_2$, CaO, $SiO_2$, and/or $TiO_2$ can be used in the electrode. Although generally less preferred due to its strong hygroscopic properties, $Li_2O$ by itself, could in certain embodiments be used in the electrode.

The levels of barium and lithium fluoride were changed to evaluate the effect of these individual slag-making agents on arc stability and resistance to porosity. Automated weld tests at sequentially increasing voltages in the vertical down position were used to evaluate the operating range of an electrode product. Increasing barium fluoride additions made the weldability of the electrode better, but did not improve the operable range of the electrode. Increasing lithium fluoride increased the voltage range of the electrode in an automated robotic test. Decreasing lithium fluoride decreased the operating range of the electrode.

The present development is particularly directed to providing electrodes, and particularly flux cored electrodes for arc welding, that utilize relatively large amounts of barium and lithium fluorides. Although the development includes electrodes with barium and/or lithium carbonates, the development is primarily directed to electrode compositions in which barium and lithium fluorides are the major components, and such fluorides being in optional combination with minor amounts of barium and/or lithium carbonates.

Additional details of arc welding materials and specifically, cored electrodes for welding are provided in U.S. Pat. Nos. 5,369,244; 5,365,036; 5,233,160; 5,225,661; 5,132,514; 5,120,931; 5,091,628; 5,055,655; 5,015,823; 5,003,155; 4,833,296; 4,723,061; 4,717,536; 4,551,610; and 4,186,293; all of which are hereby incorporated by reference.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

Having thus defined the invention, the following is claimed:

1. A flux cored electrode having a sheath and core materials in the metal sheath, said core materials including barium fluoride, lithium fluoride, lithium oxide, aluminum, and iron oxide, said core materials including about 35-55 weight percent barium fluoride, about 2-12 weight percent lithium fluoride, about 2-12 weight percent lithium oxide, about 15 weight percent aluminum, and about 5-20 weight percent iron oxide, a weight ratio of a total weight percent of barium to a total weight percent of lithium in said core materials is about 8-12:1.

2. The flux cored electrode as defined in claim 1, wherein said core materials include at least one oxide selected from the group consisting of calcium oxide, silicon oxide, manganese oxide, and mixtures thereof, said calcium oxide constituting up to about 5 weight percent of said core materials, said silicon oxide constituting up to about 5 weight percent of said core materials, said manganese oxide constituting up to about 5 weight percent of said core materials.

3. The flux cored electrode as defined in claim 1, wherein said core materials include at least one metal agent selected from the group consisting of aluminum, magnesium, titanium, zirconium, and mixtures thereof, said metal agent constituting up to about 25 weight percent of said core materials.

4. The flux cored electrode as defined in claim 1, wherein said core materials include at least one metal agent selected from the group consisting of iron, nickel, manganese, silicon, and mixtures thereof.

5. The flux cored electrode as defined in claim 1, wherein said core materials include barium fluoride, calcium oxide, iron oxide, lithium fluoride, silicon oxide, aluminum, iron, magnesium, and manganese.

6. The flux cored electrode as defined in claim 5, wherein said core materials include barium fluoride, calcium oxide, iron oxide, lithium fluoride, lithium oxide, silicon oxide, strontium fluoride, aluminum, iron, magnesium, manganese, nickel, and zirconium.

7. The flux cored electrode as defined in claim 6, wherein said core materials include aluminum oxide, barium fluoride, calcium oxide, iron oxide, lithium fluoride, lithium oxide, potassium silicofluoride, potassium oxide, silicon oxide, strontium fluoride, aluminum, iron, magnesium, manganese, nickel, and zirconium.

8. The flux cored electrode as defined in claim 1, wherein said core materials include at least one secondary lithium source selected from the group consisting of lithium carbonate, lithium oxide, complexes including lithium oxide, and mixtures thereof.

9. The flux cored electrode as defined in claim 1, wherein said core materials include barium carbonate, said barium carbonate constituting up to about 8 weight percent of said core materials.

10. The flux cored electrode as defined in claim 1, wherein said core materials include lithium carbonate, said lithium carbonate constitutes up to about 8 weight percent of said core materials.

11. The flux cored electrode as defined in claim 1, wherein said core materials include at least one secondary barium source selected from the group consisting of barium carbonate, barium monoferrate, barium oxide, complexes including barium oxide, and mixtures thereof.

\* \* \* \* \*